United States Patent [19]

Skarra et al.

[11] Patent Number: 4,781,932

[45] Date of Patent: Nov. 1, 1988

[54] FOOD SHELL AND METHOD OF MANUFACTURE

[75] Inventors: Leslie L. Skarra, Tonka Bay; James R. Evans, Burnsville; Annavarapu S. Murty, Minneapolis, all of Minn.

[73] Assignee: The Pillsbury Company, Minneapolis, Minn.

[21] Appl. No.: 82,968

[22] Filed: Aug. 6, 1987

Related U.S. Application Data

[63] Continuation of Ser. No. 791,255, Oct. 25, 1985, abandoned.

[51] Int. Cl.$^4$ .............................................. A21D 13/00
[52] U.S. Cl. .................................... 426/138; 426/302; 426/440; 426/549
[58] Field of Search ............... 426/138, 439, 549, 289, 426/302, 440; 99/448

[56] References Cited

U.S. PATENT DOCUMENTS

| | | | |
|---|---|---|---|
| 2,664,812 | 1/1954 | Molina | 99/448 |
| 3,655,385 | 4/1972 | Rubio | 426/331 |
| 3,672,912 | 6/1972 | Rubio | 426/331 |
| 3,687,685 | 8/1972 | Rubio | 426/331 |
| 3,690,895 | 9/1972 | Amadon et al. | 426/439 |
| 3,694,224 | 9/1972 | Rubio | 426/331 |
| 3,709,696 | 1/1973 | Rubio | 426/331 |
| 3,853,998 | 12/1974 | Rubio | 426/532 |
| 3,859,449 | 1/1975 | Rubio | 426/323 |
| 4,170,659 | 10/1979 | Totino et al. | 426/99 |
| 4,241,106 | 12/1980 | Tims | 426/138 |

*Primary Examiner*—George Yeung
*Attorney, Agent, or Firm*—Robert J. Lewis

[57] ABSTRACT

A food shell with improved distribution quality, eating texture and resistance to breakage or fracture is provided. A food shell is formed from a cereal grain, for example, wheat or corn, and is processed to form a blistered texture during a cook step. During cooking, the shell develops a controlled delaminated texture and is cooked adequately to make an integral shell in the desired shape. After cooking a softening agent is added to the shell to soften it for delivery to consumer without breakage. By controlling the delaminated structure, the degree of cooking and the final plasticizer content, the cooked shell, if cooked further, will produce a light, crisp and tender shell.

24 Claims, No Drawings

FOOD SHELL AND METHOD OF MANUFACTURE

This application is a continuation of application Ser. No. 791,255, filed 10/25/85, now abandoned.

BACKGROUND

In recent years, the popularity of Mexican food has seen a phenomenal increase. However, the manufacture and distribution of the shells for Mexican foods, in general, has not changed. Also, the nature of the products has not changed or improved to any great degree. The same problems that plagued such products in past years, for example, taco shells, are still problems today. Some problems with shells have been their coarse, tough texture and consequently poor eating characteristics, limited ways of use and their fragility during shipping, reducing their acceptance by consumers. Some of these problems are worsened when a shell is not freshly made and has been stored for as many as 6–18 months in a distribution system. As the popularity of Mexican foods which use such shells has increased, so has the desire for improved products for preparation at home. Because improvement has not occurred to a significant degree and because of the competition from other food products of higher quality, some consumers of these shells find them less desirable and will either not buy the shells or consume less.

It is an object of the present invention to solve the problems attendant with these products to make them more acceptable for in-home preparation.

It has now been found that by manufacturing a starch based shell having a controlled delaminated structure as hereinafter described and having a minimum level of total volatilizable softening agent in the product after final cooking that the above problems can be improved on and a more versatile shell which if cooked further by a consumer provides improved lightness and crispness and even more importantly, tenderness.

DETAILED DESCRIPTION

A food shell can be made from any starch source such as cereal grain, but preferably is made from corn flour or wheat flour or combinations of these or other cereal grains. The formula for the dough includes starch, e.g., cereal flour, plasticizers such as water and fat, polyhydric alcohol, alcohol etc. and other ingredients such as salt, flavors, yeast, chemical leavening, preservatives, gums, etc.

PROCESS

In the present invention, a dough is made by mixing the flour (as used herein, flour is used to mean any comminuted starch, e.g., cereal grain flour, unless otherwise designated) with plasticizers in an amount of flour to plasticizer to form a plastic mass having rheological characteristics suitable for subsequent processing. After mixing, the dough is transferred to a sheeting line and is formed into a continuous web, for example by extruding. The formed web is then sheeted and cut into suitably shaped pieces, e.g., round flat discs. The trim from between the cut pieces can be returned to the extruder.

The flour, plasticizer and other ingredients, if desired, are mixed in a suitable mixer to form a machinable dough. The rheology of the dough to be machinable will depend on the type of flour used, other ingredients, mixing conditions and the type of processing equipment used. If a flour contains more than about 4% by weight (hereinafter high gluten flour), on a dry basis, gluten it is desired to process the dough to peak or optimum development. Such a high gluten dough should have a rheology in Brabender unit (B.U.) value in the range of between about 550 and about 1500, preferably in the range of between about 700 and about 1200 and most preferably in a range of between about 850 and about 950. If the flour contains less than about 4% gluten (hereinafter low gluten flour) on a dry basis the dough rheology in B.U. should be in the range of between about 300 and about 1000, preferably in the range of between about 600 and about 900 and most preferably in the range of between about 700 and about 800.

If wheat flour and yeast are used, either a sponge dough method, straight dough method or a brew method can be used to produce the dough. If proofing is desired, it is preferably done after mixing and prior to extruding into a web form, for example, by letting the dough sit in a dough trough for a selected period of time. After mixing, the dough is then formed into a web by an extruder or sheeting rolls as is known in the industry. The web is then conveyed to a sheeter which sheets the dough with a series of sheeting rollers to the desired thickness. The sheeted dough is then cut preferably by rotary cutters into the desired sized and shaped item, e.g., for a taco or salad shell it is round having a diameter of about 125 mm or larger. The thickness of the cut dough is preferably in the range of between about 0.7 mm and about 1.5 mm, and more preferably in the range of between about 0.7 mm and about 1.2 mm, and most preferably in the range of between about 0.7 mm and about 0.8 mm. The unit weight of the cut dough preferably is in the range of about 0.5 to 0.85 gram/in$^2$.

High gluten dough displays characteristics of both elastic bodies and viscous fluids when mechanically stressed. The viscoelastic properties of dough are primarily due to the properties of its continuous phase gluten. Many processing operations will alter the structure of the dough by stressing it beyond its elastic limit through application of mechanical force. It was learned that the mixing and sheeting to optimum development, as tested by the stretch test as known in the art, is important to the final product performance, i.e., excessive gluten alignment in one direction or overmixing causes weakening or tearing of the shells in high gluten doughs. In low gluten doughs, overmixing usually results in excessive breakdown of the flour particles and leaching out of soluble materials particularly from the starch granules. This will create a sticky dough and one that is difficult to sheet.

It is preferred that the dough be cut continuously by a rotating cutter head which leaves trim between the cut pieces and along the edges which can be returned, as is known in the art, back to the extruder or dough web forming device, preferably not to achieve more than about 50% by weight of the dough being returned as trim when the flour is high gluten. With corn dough or other low glute flour doughs, there generally is no upper limit on the amount of returned trim.

Preferably, prior to cooking, the piece or its formula is manipulated in a manner to help control the delamination. That is, certain areas of the shell are restrained from delaminating. This can be done by docking or having a flour containing some large starch particles. Constraint during cooking can also be used to help control delamination as described below.

The cut pieces are then cooked to provide strength adequate for subsequent bending and handling, i.e. to a water holding capacity (WHC) of more than about 1.2 and a moisture content of less than about 40% by weight. WHC is measured by the following test procedure:

Water holding capacity (or water binding) is defined as the maximum amount of water 1 G of material will retain under low speed centrifugation. Samples of cooked product are ground to a uniform size, subsampled, and allowed to absorb water. A minimum amount of water is added such that there is enough to saturate the sample but avoid solubilization of low molecular weight components. The increase in sample weight due to water absorption is determined after separating the excess water by centrifugation. The steps are:

(1) Determine total moisture on ground sample using a suitable moisture method.

(2) Weigh 50 ML plastic centrifuge tube and record weight ±0.01 G (note: run samples in duplicate).

(3) Weigh 5.0 G of sample (±0.01 G) into tared centrifuge tube and record sample weight.

(4) Add distilled water to tube and sample. Amount of water should be between ⅓ and ½ the volume of the tube (excess water).

(5) Cover tube with parafilm or other suitable material and let tube and contents stand for 2 minutes.

(6) Shake tube vigorously by hand.

(7) Let mixture stand for 2 minutes after mixing.

(8) Repeat steps 6 and 7 once.

(9) Remove cover (parafilm or other).

(10) Centrifuge at 1600 X G for 5 minutes.

(11) Carefully decant supernatant.

(12) Weigh tube and contents. Record weight.

(13) Calculate water holding capacity on dry weight basis by the formula:

$$WHC = \frac{WS - W + (M \times S)}{S(1 - M)}$$

Where:
WS = Weight of centrifuge tube + sediment.
W = Weight of centrifuge tube + sample.
S = Sample weight.
M = Moisture % of sample divided by 100

Preferably cooking is done in two steps. The first cooking step preferably is baking, and is done sufficiently to form the delaminated areas and to set the structure adequately in the shell to provide a shell that will be acceptable for further cooking, preferably by frying. The baking can be done in a one or three pass oven at a temperature of between about 176° C. and about 426° C., preferably in the range of between 204° C. and about 315° C., and most preferably in the range of between about 218° C. and about 245° C. The heat should be high enough to form blisters in the shell. The product is baked for a time period preferably in the range of between about 20 seconds and about 55 seconds and more preferably in the range of about 25 seconds and about 45 seconds. The time of baking is dependent upon the temperature and should be cooked at a high enough temperature for a long enough time to set the structure of the shell without making the shell friable or excessively dry. The total volatilizable plasticizer, which is preferably water, content of the baked piece is in the range of between about 29% and about 40%, preferably in the range of between about 32% and about 37% and most preferably in the range of between about 33% and 35% by weight of baked shell. Baked weight preferably is about 0.50–0.75 grams/in². The shell after baking is still soft and has a WHC of more than about 1.2. It is preferred that during baking the shell be turned so that both sides will be baked. After exiting the baking oven, the shells are then ready for finish cooking.

Baking conditions are believed to be important to product quality. If the product is underbaked, the interior starch granules are not adequately gelatinized resulting in a weak structure. If the product is overbaked, the interior starch is highly gelatinized (high degree of swelling) making a much stronger structure but also giving a tough eating texture because of the increased strength. Slow baking can result in less delamination, while fast baking can result in excessive delamination.

The temperature of the baking oven is high enough to rapidly dehydrate the surface and create a thin crust. As a result of rapid surface dehydration, the surface starch granules remain ungelatinized while the internal starch granules absorb water and become partially gelatinized (as measured by loss of birefringence). As internal water is heated, it changes to steam, and if done fast enough, blisters or delaminated areas in the shell are formed by entrapped steam. The extent of delamination can be controlled by the flour granulation, constraint, docking and/or oven temperature.

For final cooking, the shells are fried by immersion in the frying oil. A frying step is preferred because it gives the product the light, tender and crisp texture and its unique flavor. Fat also acts as a plasticizer in the system and provides flexibility to the product. The shells are fried until a rigid or friable structure is set. The fried shells are then removed from the fryer, deoiled, treated, for example by misting, with a softening agent, cooled and packaged. Preferably the fried shells are cooled to approximately 40° F. (4.5° C.) within 6 hours of frying and are then stored at about 40° F. (4.5° C.) until they are to be consumed. If preservatives are used, cooling is not as important.

The final cooking of the product, as discssed above, is by par frying in oil. Frying is done at a temperature and for a time sufficient to rigidify the structure to a friable condition and to replace some of the water with fat so the product has a tender bite and fried flavor. The fried product after cooling to room temperature is rigid, i.e cannot be bent more than about 30 degrees and preferably no more than 20 degrees without breaking. Preferably the frying is at a temperature between about 160° C. and about 220° C., preferably at a temperature between about 175° C. and about 205° C., and most preferably at a temperature between about 185° C. and about 195° C. The preferred frying fat is oil that has a high stability, bland flavor and taste, and is perceived as oily e.g. hydrogenated soy oil. The time of frying is in the range between about 5 seconds and about 25 seconds, preferably in the range of between about 6 seconds and about 20 seconds, and most preferably in the range of between about 8 seconds and about 10 seconds.

After final cooking it is preferred that the finally cooked product hve a volatilizable plasticizer, preferably water, content in the range of between about 4% and about 12%, more preferably in the range of between about 6% and about 11%, and most preferably in the range of between about 7% and about 9% by weight of the finally cooked product.

After frying, the shell is preferably deoiled with forced hot air. After deoiling, the fat content is in the range of between about 20% and about 38%, preferably in the range of between about 24% and about 35% and more preferably in the range of between about 25% and 28% by weight of product.

The total plasticizer content of the fried shell is in the range of between about 25% and about 55%, preferably in the range of between about 30% and about 50% and more preferably in the range of between about 35% and about 45% by weight of finally cooked (fried) product. The polyhydric alcohol content, if used, is about the same as the ranges for the dough. The flour is present in the range of between about 47% and about 76%, preferably in the range of between about 51% and about 70% and more preferably in the range of between about 60% and about 68% by weight of cooked product.

The shell after par-frying has a density in the range of between about 0.50 g/cc and about 0.68 g/cc, preferably in the range of between about 0.55 g/cc and about 0.65 g/cc, and most preferably in the range of between about 0.57 g/cc and about 0.58 g/cc. This light density is due to the delaminated nature of the product leaving voids in the rigid structure.

The shell is preferably misted with a volatilizable softening agent, which can be the same as the volatilizable plasticizer, preferably water, after deoiling. The softening agent, hereinafter referred to as water, is added to the shell in an amount sufficient so that it in combination with the plasticizer in the shell will result in the shell regaining its soft and flexible, prefried texture. The softening agent is added such that it is present in the range of between about 3% and about 10%, preferably in the range of between about 4% and about 7% and more preferably in the range of between about 5% and about 6% by weight of softened shell. Flexible means that the product is not friable, and when bent 90 degrees does not appreciably crack or break at room temperature. The total volatilizable plasticizer and softening agent, both preferably water, content of the shell after misting is in the range of between about 8% to about 22%, and more preferably in the range of 10% and about 18%, and most preferably between about 12% and about 14% by weight of the softened shell. The nonvolatilizable plasticizer is present in the range of between about 20% and about 38%, preferably in the range of between about 24% and about 35% and more preferably in the range of between about 25% and about 34% by weight of softened shell. The amount of polyhydric alcohol, if used, is present in about the same levels by weight of softened shell as it was in the dough.

In order to achieve higher levels of moisture (volatilizable liquid and softening agent), for example above about 8% after the final cooking and softening of the shell when made with wheat flour, it has been found advantageous to mist the finally cooked and deoiled product with water rather than provide enough water (or plasticizer) in the initial mix to achieve this final moisture (fluid) content. This helps in handling the dough initially and provides the product with more desirable textural attributes. The final total water is described above. Total plasticizer content plus softening agent is in the range of between about 28% and about 60%, preferably in the range of between about 34% and about 53% and more preferably in the range of between about 37% and about 48% by weight of softened product. The flour content of the softened product is in the range of between about 37% and about 72%, preferably in the range of between about 44% and about 56% and more preferably in the range of between about 49% and about 63% by weight of softened product. It is preferred that starch be present in an amount above 25% and more preferably above 30% by weight of softened product.

The product can then be cooled to about 7° C. or can be packaged, in a moisture barrier sealed plastic pouch, and then cooled. Preferably the product is cooled to 7° C. within 6 hours of frying. The packaging should have barrier properties adequate to maintain the disclosed levels of volatilizable plasticizer (moisture) of the softened product.

The cooked and softened product has a soft and flexible texture and is pliable and can be folded or cooked over a former without cracking.

If no preservatives are added, a high water content provides the product with an $A_w$ (water activity level) at which microorganisms will grow. If no preservatives are added it is then preferred to refrigerate the product to provide microbiological stability. Refrigerated storage is typically about 40° F. (4.5° C.).

As used herein, delaminated means an area of the shell that has separated into two walls. The walls can be separated by a space or void in between or can be unconnected, except at the peripheral edge, except for small areas such as at docking holes or other means of connection. The delamination can take the form of blisters where the walls are connected at the peripheral edge. The delamination can also be in form where the walls are connected together in small areas by docking holes or other means. The delamination can be random or regular, as can be the spots where the walls are connected.

The extent of delamination is important to achieve a tender texture but is preferably limited at the upper end to avoid breakage when friable. The delamination, based on the surface area of the shell, is greater than about 60%, preferably greater than about 75%, and more preferably greater than about 85%. This value is calculated by dividing the total area of the shell that is separated into two walls (with only those separated areas that exceed an area greater than 5 mm² considered delaminated for the calculation) by the total area of the shell. The average size of the delaminated area(s) should exceed about 5 mm², preferably greater than about 75 mm², more preferably greater than about 200 mm². The average size of the delaminated area(s) is in the range of between about 5 mm² and about 2600 mm², preferably in the range of between about 75 mm² and about 1100 mm², and more preferably in the range of between about 200 mm² and about 400 mm².

It has been found that by having the high moisture content (or volatilizable plasticizer plus softening agent) and the delaminated or blistered structure as described above, the product when, and if, finally cooked by the consumer has a very light, crisp and tender product. Cooking by a consumer is at a temperature in the range of between about 160° C. and about 230° C. for a time in the range of between about 4 min. and about 10 min. Cooking is done until the product is friable.

The crisp and light texture upon subsequent cooking by a consumer is attributed to the controlled delamination of the shell. Blistered shells have been known to the art but were avoided because of fragility. However, contrary to this practice of the art, it has been found that by having a controlled but highly delaminated structure that a superior shell can be produced if fried to completion. Addition of a misting step permitted an increase in the total plasticizer content in the shell, which then eliminated the distribution issues, i.e., breakage. Control of delamination can be by docking, constraint during cooking and/or preferably by control of the coarse and fine particles distribution of the flour as hereinafter described.

FORMULA

The preferred flour is either corn or wheat, however, any starch source such as cereal grain can be used individually or in combination. It is preferred that the flour be a majority from one grain, e.g. corn or wheat and preferably at least about 75% and more preferably at least about 90%. After frying, the product contains at least about 25% and preferably at least about 30% by weight starch on a dry basis. The flour preferably is a mixture of coarse and fine particles, particularly when the flour is low gluten e.g. corn. The flour should have particle sizes wherein at least about 5% should be on USSB 50 and at least about 20% should be on USSB 100 and preferably has the following distribution of particle sizes in the range of between about 5% and about 20% on USSB50 and in the range of between about 20% and about 55% on USSB100 and the remainder is finer—using RoTap granulation procedure. When the flour is high gluten, e.g., wheat, it is preferred to control delamination by docking. Flour is present with plasticizer in relative amounts to form a machinable dough and preferably the flour, on a dry basis, is present in an amount in the range of between about 40% and about 65%, preferably in the range of between about 43% and about 60%, and most preferably in the range of between about 45% and 55% by weight of dough.

Plasticizer as used herein is a material, generally liquid, incorporated in a polymer such as flour to increase the workability, flexibility or extensibility changing the rheological character of the flour to a viscous plastic mass. The preferred plasticizers include volatilizable and non volatilizable substances such as water and fat with a combination preferred. Volatilizable plasticizing liquid or substance as used herein has a vaporization temperature at standard pressure of less than 120° C. and non volatilizable plasticizing liquid or substance as used herein has a vaporization temperature at standard pressure of more than 120° C. The preferred volatilizable liquid is water but could include alcohol and the preferred non volatilizable liquid are fats such as shortening, oil and/or polyhydric alcohols. Total volatilizable plasticizer including water present in the dough components, preferably water, is present in the dough in the range of between about 30% and about 57%, preferably in the range of between about 35% and about 54%, and most preferably in the range of between about 35% and about 52.5% by weight of dough. For low gluten flour doughs, total volatilizable plasticizer, preferably water, is present in the range of between about 42% and about 57%, preferably in the range of between about 48% and about 54%, and more preferably in the range of between about 50.5% and about 52.5% by weight of dough. For high gluten flour doughs, total volatilizable plasticizer, preferably water, is present in the range of between about 30% and about 50%, preferably in the range of between about 35% and about 45%, and more preferably in the range of between about 35% and about 38% by weight of dough. The total non volatilizable plasticizer, preferably fat, is in the range of between about 2% and about 20%, preferably in the range of between about 6% and about 14% and more preferably in the range of between about 8% and about 12% by weight of dough. When polyhydric alcohol, for example glycerol and/or sorbitol, is used in addition to fat as a portion of the nonvolatilizable plasticizer it is present in the range of between 1% and about 10%, preferably in the range of between about 3% and about 7% and more preferably in the range of between about 4% and about 6% weight of dough and the fat is present in the range of between about 1% and about 10%, preferably in the range of between about 3% and about 7% and more preferably in the range of between about 4% and about 6% by weight of dough. The total plasticizer content is in the range of between about 35% and about 65%, preferably in the range of between about 37% and about 61% and more preferably in the range of between about 45% and about 55% by weight of dough.

The other ingredients are present in the following approximate percentages: salt 0.5%–1.5%, gum 0.1%–1.5%, preservatives 0.1%–0.3% by weight and flavors as desired. The preferred ingredients are: fat—hydrogenated vegetabe shortening; polyhydric alcohol—glycerol for high gluten flour, soritol for corn; gum—HPMC (hydroxypropyl methyl cellulose) or CMC (carboxy methyl cellulose); and corn or a strong wheat flour.

The shell can be prepared by the consumer for consumption by one of at least two methods. The soft shell as it comes from the package can be used directly by the consumer by wrapping it around a filling, by sprinkling a topping on it, etc., and does not need to be cooked when the existing soft texture is desired, for example, in a tortilla. If the consumer desired a crisp texture, the consumer can then cook the shell by first filling the shell with a food filling, for example, meat and cheese, and baking the shell and filling in the oven until the shell is crisp. The shell can also be baked in an oven at home over a former, and because of the soft texture of the shell, the heat will allow the shell to further soften and drape over the former and assume a shape similar to that of the former. For example, a typical "U" shaped taco, or a taco salad shell. The baking is continued until the shell reaches the desired degree of crispness. Preferably when the shell is filled prior to baking, the baking temperature of the oven is between about 160° C. and about 230° C. until crisp. When the shell is desired to be baked without filling, it is preferred that the baking temperature of the oven be between 160° C. and about 230° C. until friable as described above.

The finally cooked product is characterized by its delaminated structure, its crisp, tender and light texture.

A fracture starts in the product and tends to go straight and from edge to edge. However, in the inventive structure a crack goes to a delaminated are and then can change direction or terminate. The strength of a delaminated wall, under a biting load, is less than the composite strength of the two walls of a delaminated area or an undelaminated area thus helping to reduce fracture breakage while eating.

It has been found that by having a higher $A_w$ or moisture content of the product that the fragility of the softened product is greatly reduced, reducing damage during shipping and provides a product which can be used to produce a soft shell or friable shell product. Upon further cooking by a consumer, the shell exhibits lightness and tenderness in the product.

It has been found that when the piece is in a form of a chip, a relatively flat chip can be made by the three-step cooking process described above, that is, the dough is first baked and then par-fried, then cooked to a friable condition. After par-frying, the moisture should be above about 5% by weight of the chip, which can be achieved by limiting water loss during frying or adding water back to achieve this water level. Typically chips after cooking assume a very nonuniform contour unless they are restrained during cooking. This uniform contour was surprising. The invention can be used to make friable chips delivered in a friable condition to a consumer, or could be made friable by a consumer at home. The softened chip, upon final cooking to a friable condition with a moisture content of about 2% by weight of chip, could also be finally cooked on a former so that it would achieve the shape of the former in a relatively uniform manner. A chip as used herein has a surface area of less than about 4 in$^2$ (26 cm$^2$).

It has been known in the restaurant industry to make a wheat flour salad shell with a highly blistered structure. However, the invention provides a product from which such a shell can be made but does not exhibit fragility during shipping, which was not a problem in the restaurant since the product was made and used fresh. Surprisingly, it was found that in this type of product that the blistering could be achieved without docking and still provide connected areas between the walls to make the product stronger than a totally blistered product and also a product less susceptible to damage to the blisters.

What is claimed is:

1. A cooked dough food piece which is relatively thin and flexible and has been partially fried, said piece is adapted for further cooking to make same friable, said piece contains:

at least about 25% starch by weight and plasticizer and softening agent in amounts sufficient to make said piece flexible, said plasticizer includes nonvolatilizable plasticizer in the range of between about 20% and about 38% by weight of said piece, said food piece having at least one delaminated portion, said delaminated portion being in an amount of at least about 60% of the food piece surface area with said delaminated portion having an average size exceeding about 5 mm$^2$.

2. A food piece as set forth in claim 1 wherein the plasticizer and softening agent are present in the range of between about 28% and about 60% by weight of said food piece.

3. A food piece as set forth in claim 2 wherein the plasticizer includes a volatilizable portion and the nonvolatilizable portion, said volatilizable plasticizer includes water, said softening agent also includes water, with said water being present in an amount in the range of between about 8% and about 22% by weight of said food piece.

4. A food piece as set forth in claim 3 wherein said nonvolatilizable plasticizer includes fat said nonvolatilizable plasticizer being present in an amount in the range of between about 20% and about 38% by weight of said piece.

5. A food piece as set forth in claim 1, 2, 3 or 4 wherein a majority of said starch is from corn.

6. A food piece as set forth in claim 1, 2, 3 or 4 wherein a majority of said starch is from wheat.

7. A food piece as set forth in claim 1, 2, 3 or 4 wherein said piece contains flour with said starch being a portion thereof, said flour is a low gluten flour containing less than about 4% gluten and said flour has a grind of at least about 5% by weight on USSS 50 and at least about 20% by weight on USSS 100.

8. A food piece as set forth in claim 1, 2, 3 or 4 wherein said piece contains flour with said starch being a portion thereof, said flour is a high gluten flour containing more than about 4% gluten by weight of flour.

9. A food piece as set forth in claim 8 wherein said food piece is docked sufficiently to control delamination.

10. A food piece as set forth in claim 1, 2, 3 or 4 wherein said piece is baked and fried.

11. A method of making a relatively thin and flexible food piece including
(a) making a dough from a starch containing flour and plasticizer;
(b) forming said dough into a piece having a predetermined shape;
(c) cooking said piece until they are rigid and, during cooking, forming at least one delaminated portion in the dough piece, the delaminated portion being in an amount of at least about 60% of the food piece surface area with said delaminated portion having an average size exceeding about 5 mm$^2$; and
(d) adding a softening agent to said cooked dough piece in an amount sufficient to render said cooked dough piece soft and flexible.

12. A method as set forth in claim 11 wherein said piece is packaged in a sealed package for storage.

13. A method as set forth in claim 12 wherein said piece is readily consumable upon removal from the package.

14. A method as set forth in claim 12 wherein said piece is further cooked after removing said piece from said package wherein said cooking is sufficient to render at least a portion of said piece friable.

15. A method of making a food piece as set forth in claim 14 wherein a filling is placed on a portion of said piece before said further cooking.

16. A method of making a food piece as set forth in claim 14 wherein said piece is placed on a former prior to the further cooking of said piece to a friable condition wherein said piece assumes a predetermined shape similar to the former.

17. A method of making a food piece as set forth in claim 14 wherein said flour is a high gluten flour containing gluten in an amount more than about 4% by weight of flour.

18. A food piece as set forth in claim 14 wherein the said flour is a low gluten flour containing gluten in an amount less than about 4% by weight of flour gluten.

19. A method of making a food piece as set forth in claim 11 wherein the cooking of said food piece is first by baking and then by frying.

20. A method of making a food piece as set forth in claim 11, 12, 13 or 19 wherein the softenuing agent includes water wherein the total water content of the softened piece is in the range of between about 8% and about 22% by weight of softened piece.

21. A method of making a food piece as set forth in claim 20 wherein said plasticizer includes nonvolatilizable plasticizer which includes fat, the nonvolatilizable plasticizer content of the softened piece is in the range of between about 20% and about 38% by weight of said piece.

22. A method as set forth in claim 11 including cooking the thus softened piece sufficiently to produce a friable piece having a total water content of about 2% by weight of friable piece.

23. A method of making a food piece as set forth in claim 11, 12, 13 or 19 wherein said plasticizer includes nonvolatilizable plasticizer which includes fat, the nonvolatilizable plasticizer content of the softened piece is in the range of between about 20% and about 38% by weight of said piece.

24. A method of making a food piece as set forth in claim 23 wherein the softening agent includes water wherein the total water content of the softened piece is in the range of between about 8% and about 22% by weight of softened piece.

* * * * *